INVENTORS
FORREST A. NELSON
WESTON A. ANDERSON
JOHN V. ROCK

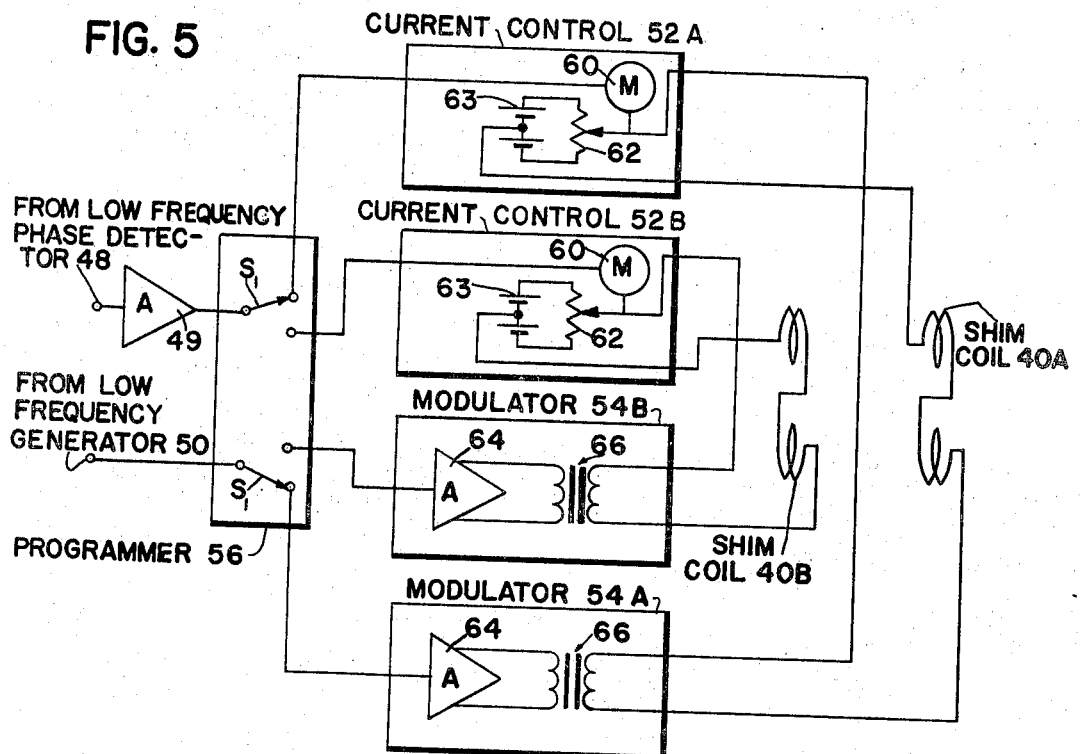
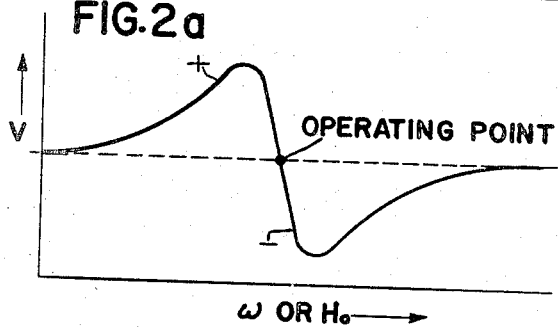
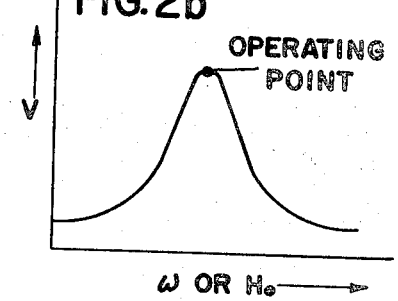
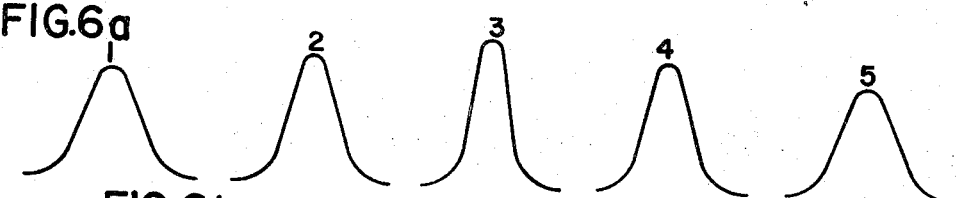
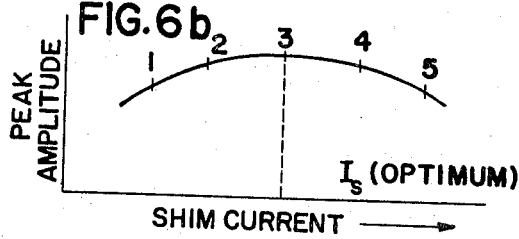

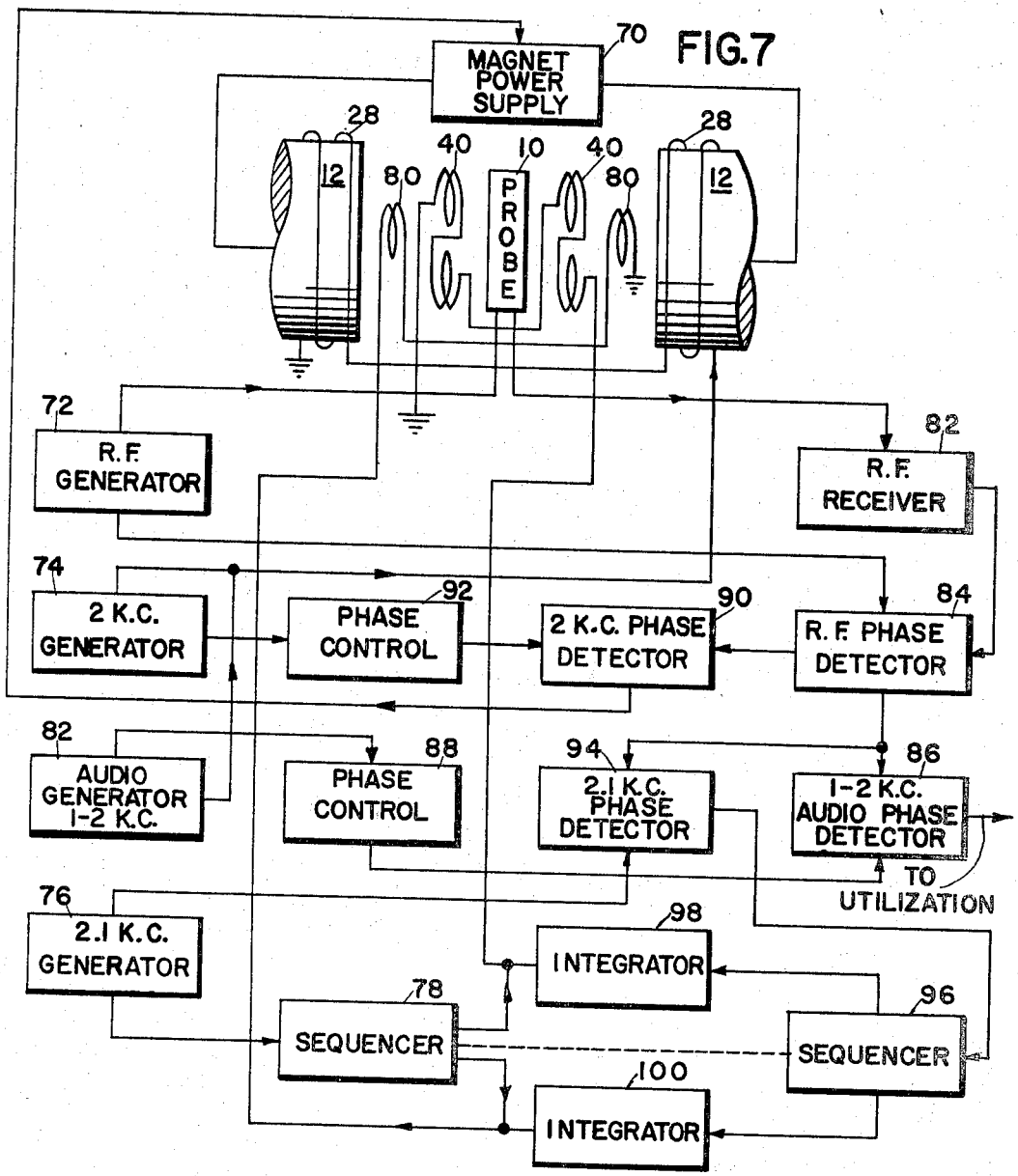

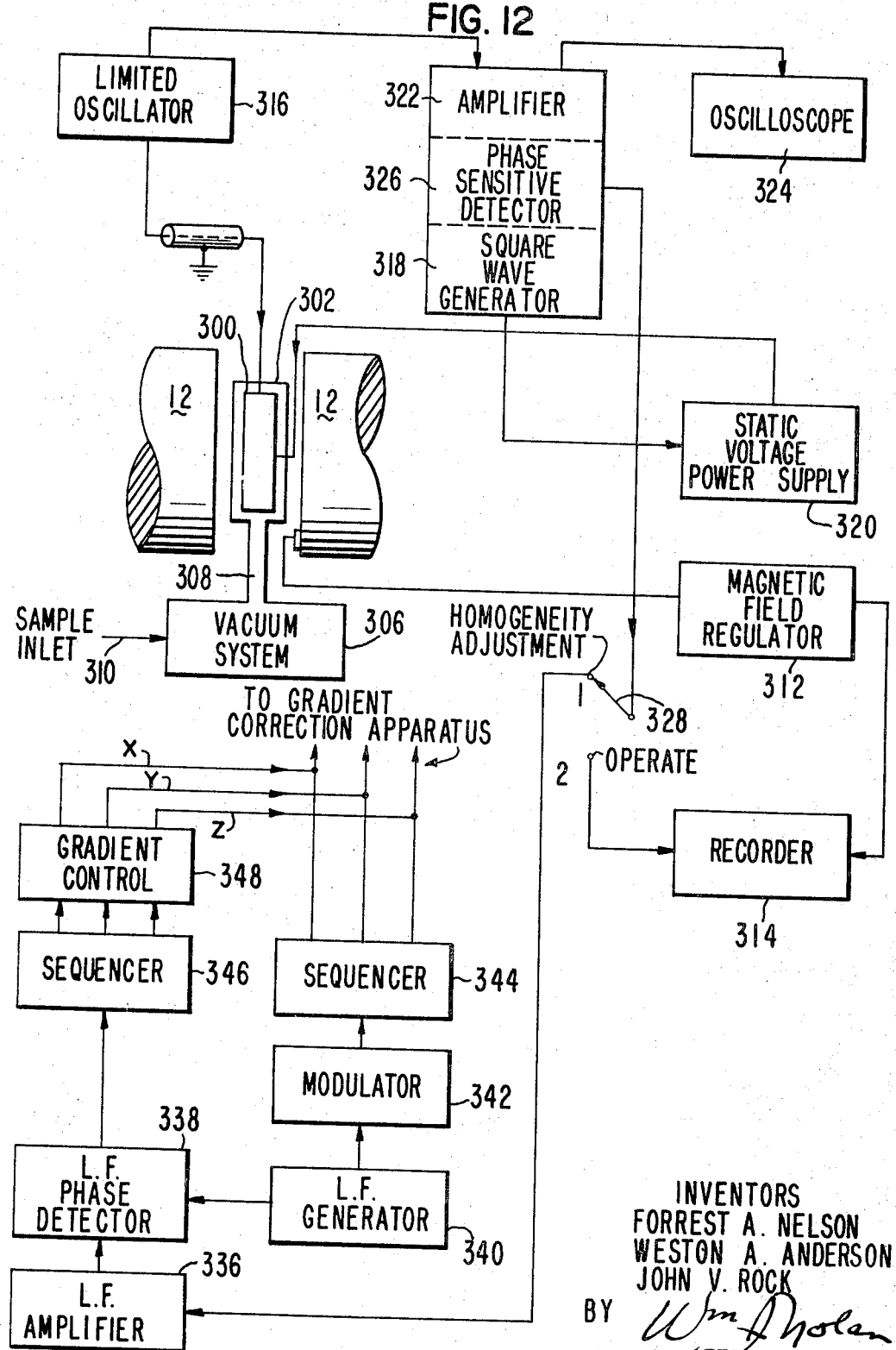

United States Patent Office 3,443,209
Patented May 6, 1969

3,443,209
MAGNETIC FIELD HOMOGENEITY
CONTROL APPARATUS
Forrest A. Nelson, Weston A. Anderson, and John V.
Rock, Palo Alto, Calif., assignors to Varian Associates,
Palo Alto, Calif., a corporation of California
Continuation-in-part of application Ser. No. 372,626,
June 4, 1964. This application Oct. 25, 1967, Ser.
No. 681,057
Int. Cl. G01n 27/78; G01r 33/08
U.S. Cl. 324—.5                                23 Claims

ABSTRACT OF THE DISCLOSURE

A method and apparatus for obtaining field homogeneity using magnetic field gradient control is disclosed wherein means are provided for detecting and altering the magnetic field in the vicinity of an analytical sample so as to maintain homgeneous the magnetic field encompassing the sample. This is accomplished by modulating the field gradient, detecting the effect of the modulation on a resonance signal, converting the detected signal to a control signal and then applying this control signal to a suitable magnetic field gradient control apparatus.

This invention relates to gyromagnetic resonance apparatus, and in particular to novel automatic homogeneity control circuits useful with such apparatus.

The present application is a continuation-in-part of the copending application Ser. No. 372,626 filed June 4, 1964, now abandoned, entitled Gyromagnetic Resonance Apparatus Including Field Gradient Correcting Means and assigned to the assignee of the present invention.

DESCRIPTION OF THE PRIOR ART

In known gyromagnetic resonance apparatus, such as spectrometers, a sample probe containing an unknown sample to be investigated and identified, is located in a polarizing magnetic field $H_0$ so that the atom portions of the sample may be oriented relative to $H_0$. The atom portions, which may be nuclei for example, are excited to resonance by the application of a radio frequency field $H_1$ of suitable frequency. The magnet supplying the polarizing field, or alternatively the source of radio frequency signal, may be modulated at a relatively low frequency to sweep across the resonance of the atom portions of the samples. Spectral resonance traces or lines may be recorded and compared to a reference line position to establish the identity of the unknown sample.

However, as a result of temperature changes and other variations in ambient conditions and in the parameters of the system, the gradients of the polarizing field $H_0$ tend to drift or shift causing a broadening of the observed resonance lines, with a resultant reduction in signal amplitude and diminution of spectral trace peaks. As a result, it becomes more difficult to interpret the spectral traces. Several approaches or solutions have been offered to compensate for such spurious action, generally requiring various manual adjustments or the addition of numerous coils or adjustable magnetic devices in the vicinity of the magnet supplying the polarizing field. For example, manually adjustable shim coils have been utilized of the type shown and described in U.S. Patents 2,858,504 and 3,199,021. These approaches usually require tedious and time consuming attention by an operator of the apparatus, and/or complex and expensive structures and circuitry. If not adjusted continuously or frequently so that a highly homogeneous field is maintained, the resonance lines become smeared and suffer from poor resolution.

OBJECTS AND SUMMARY OF THE INVENTION

An object of this invention is to provide an improved gyromagnetic and mass spectrometer apparatus that incorporates an automatic homogeneity control.

Another object of this invention is to provide an improved gyromagnetic resonance and cyclotron resonance method and apparatus wherein automatic compensation for the gradients and curvature of a magnetic field may be achieved.

A further object of this invention is to provide a method and apparatus for continuously maintaing a given magnetic field magnetically homogeneous during execution of an analytical process involving utilization of the field.

According to this invention, a gyromagnetic resonance apparatus comprises a magnet for supplying a polarizing field that encompasses a sample to be analyzed. A resonance signal that is induced by means of a radio frequency (R.F.) exciting field applied to the sample is detected and displayed, for example, on a recorder. An automatic homogeneity control loop is utilized wherein the induced resonance signal is modulated at a second frequency, and the detected signal is compared to a second reference signal to obtain a control current. This control current is applied to shim coils associated with the magnet to correct the gradients or curvature of the polarizing field. In this manner, the configuration of a magnetic field may be controlled automatically. In addition, known forms of field-frequency control may be simultaneously used to produce automatic control of the total field $H_0$ or frequency $H_1$ for field frequency stability.

In a particular embodiment of this invention, a gyromagnetic resonance apparatus, which utilizes a reference sample that is internal to the probe or tube containing the unknown sample, comprises a magnet for supplying a polarizing field and an R.F. means that generates a signal of suitable frequency for exciting the samples to resonance. A receiver means comprises a first signal channel for detecting and recording the absorption mode signal; and a second signal channel that serves as a field or frequency lock and employs the detected dispersion mode signal for controlling the frequency of the R.F. means or the polarizing magnetic field, so that one of the resonance lines derived from the sample is fixed at the center of resonance. The current to the shim coils associated with the magnet is automatically adjusted so that the homogeneity of the magnetic field is maintained at an optimum or near the optimum continuously. In this embodiment, the shim coil current is varied as a slow step or wave function, such as a square wave or sine wave of very low frequency, in accordance with the amplitude of the gyromagnetic resonance signal that is detected. The amplitude variations in the detected resonance line result in changes in the current that is fed to the shim coils so that variations in the gradient controlled by the coils are minimized. In this manner, resonance lines having peaks of substantially maximum aplitude are obtained.

Another embodiment is similar to the above embodiment except that the variation of the shim coil current is done at a relatively high frequency as compared to the low frequency of the first embodiment.

In another embodiment of this invention, the automatic homogeneity control loop utilizes a modulating signal that is applied to a plurality of magnet shim coils to correct for gradients or curvature. The modulating signal is applied in alternate fashion to the shim coils by means of sequencers and integrators, and the modulated NMR resonance signal is detected, and the modulation component is phase detected to derive a DC voltage. The DC voltage is applied in sequence to vary the currents of the shim coils, each coil receiving a correcting voltage substantially simultaneously with the modulating signal. It is to be understood that correction may be effectuated after measurements have been made, and need not be a simultaneous condition, as for example, with computer measurement and program control.

BRIEF DESCRIPTION OF THE DRAWINGS

The invention will be described in greater detail with reference to the drawings in which:

FIGS. 2a–b are representative curves of the dispersion and absorption signals respectively;

FIG. 5 is a schematic circuit diagram of a plurality of current controls and modulators, of the type that may be utilized in the apparatus of FIG. 1;

FIGS. 6a–b are, respectively, illustrative waveforms, and a curve indicating the relation of the peaks of such waveforms;

FIG. 7 is an alternative embodiment of this invention;

FIG. 12 illustrates the use of the present invention in a cyclotron resonance apparatus.

DESCRIPTION OF THE PREFERRED EMBODIMENTS

Figure 1:
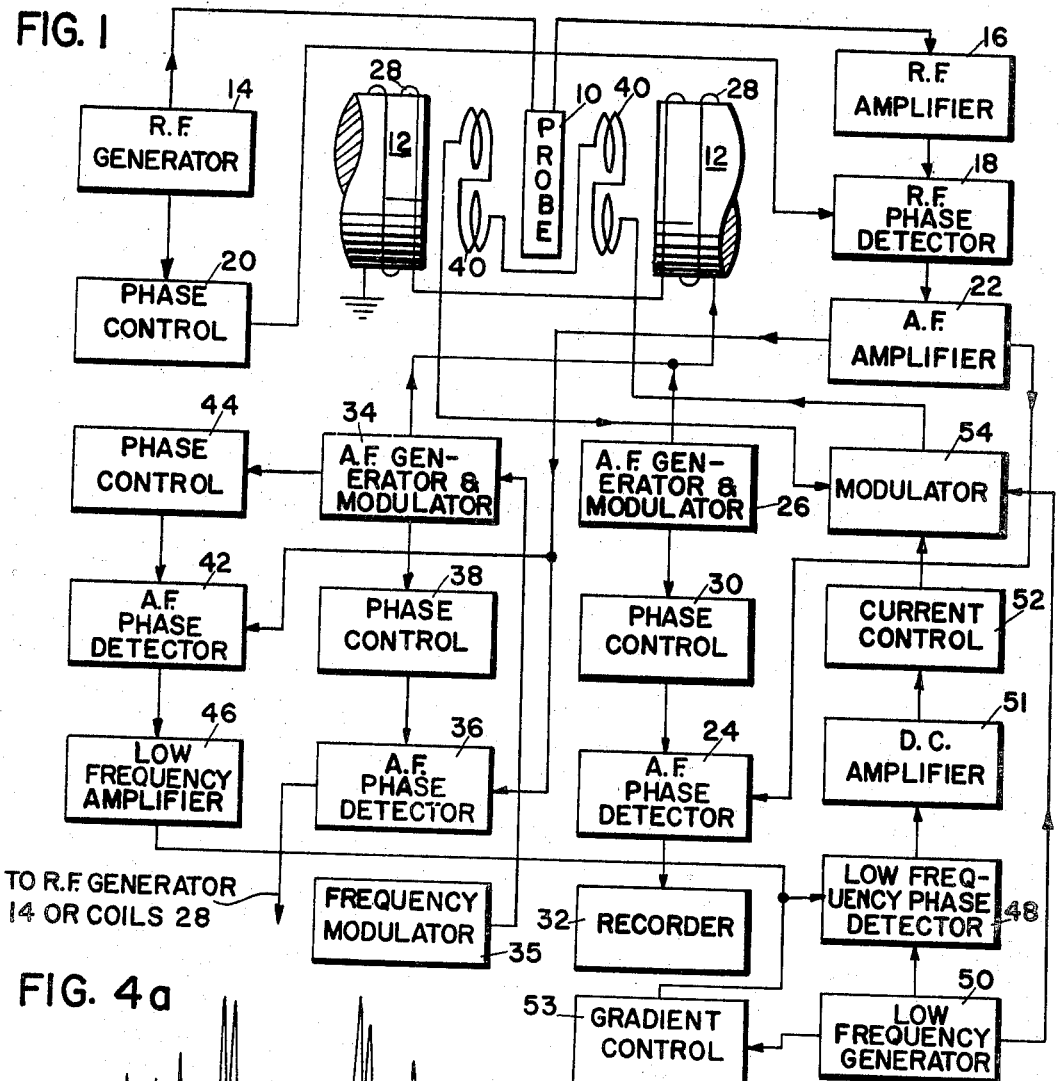
FIG. 1 is a schematic and block diagram of an embodiment of a gyromagnetic resonance apparatus, in accordance with this invention.

In FIG. 1, a probe 10 containing a sample to be analyzed and a reference sample in the same container is located within a polarizing field $H_0$ provided between the pole members of a magnet. The internal reference sample may be tetramethylsilane (TMS), for example, which is mixed physically in solution with the unknown sample, the TMS being about 1% of the total solution. Alternatively, the reference sample may be in a separate capillary tube.

The atom portions of the samples (for example, protons), which may be spinning, are oriented by the unidirectional polarizing field $H_0$ in a preferred direction.

A radio frequency generator 14 provides an alternating signal of frequency $\omega_1$, such as 60 megahertz to the sample probe to excite the protons in the reference and unknown samples to resonance. A spectral peak is obtained from the reference sample to serve as a reference indication when recording the spectral traces of the sample being analyzed. The resonance signals obtained from the probe 10 are directed to a radio frequency amplifier 16 and then fed to a radio frequency phase detector 18. Simultaneously, the $\omega_1$ signal from the R.F. generator 14 is channeled to the phase detector 18 through a phase control 20 whereby DC or audio frequency signals are obtained. These signals are passed through an audio frequency amplifier 22 to a phase detector 24.

Concurrently, an audio frequency generator and modulator 26 supplies a modulating signal $\omega_{m1}$ of about 2,000 Hertz by way of example, to the coils 28 encompassing the magnet pole members 12 or the sample region of the probe, and also to the phase detector 24 through a phase control 30. The control or phase shifter 30 is usually set for detection of the absorption mode of the magnetic resonance signal of the sample to be analyzed. This modulation is used to produce sideband resonance signals from the sample to be analyzed as shown and described in U.S. Pat. 3,147,428. The 2 kHz. modulating signal with appropriate phase is applied to the phase detector 24 and compared to the 2 kHz. component of the resonance signal received from the sample to be analyzed.

If the magnetic field $H_0$ is swept as described below, a varying DC signal is derived from the phase detector 24 and is utilized for tracing spectral representations in the form of amplitude versus time on the chart of a recorder 32. Such representations may be analyzed and interpreted with reference to the standard or reference spectral peak to establish the contents or makeup of the sample under investigation. With the portion of the apparatus of FIG. 1 so far described it would be possible to maintain $H_0$ constant, and derive the spectrum by a slow sweep of $\omega_{m1}$, about its 2 kHz. frequency.

In this particular embodiment of the invention, a second audio frequency generator and modulator 34 supplies a second modulating signal $\omega_{m2}$ to the coils 28. The $\omega_{m2}$ signal from the generator 34 modulates the field $H_0$ to produce sideband resonance signals from the reference sample in the manner described in U.S. Pat. 3,147,428. A frequency modulator 35 coupled to the generator 34 varies the frequency $\omega_{m2}$, between 1.5 to 3 kHz., for example, so that the modulating signal $\omega_{m2}$, applied to coils 28, is continuously varied in frequency. The modulating signal $\omega_{m2}$ is also applied to a phase detector 36 through a phase control or phase shifter 38. The phase control 38 is set so that the dispersion mode of the reference sample resonance signal is detected at the output of this channel. It is noted that the phase of $\omega_{m1}$ is usually set by phase control 30 so that the output from phase detector 24 gives a spectrum of absorption lines, but the phase of $\omega_{m2}$ is set by phase control 38 so that the phase detector 36 gives a spectrum of dispersion lines. In operation, the output from phase detector 36 is used to control the field-frequency ratio by controlling the field of the magnet 12, the frequency of the R.F. generator 14, or both and to sweep one or the other at the rate determined by frequency modulator 35. This control and sweep function is performed by first adjusting the field $H_0$ and frequency $\omega_1 + \omega_{m2}$ or $\omega_1 - \omega_{m2}$, so that the output from the phase detector 36 is at the center of a single line which is the reference line, for example, TMS. Then the output from phase detector 36 is connected to whichever element, i.e., magnet 12 or generator 14, is being controlled. At the center of the line the dispersion mode has zero output as shown by FIG. 2a. However, if the field or frequency drifts off this central position or operating point, then the output from phase detector 36 gives an error signal which controls the field or frequency, so as to return the output from the detector 36 to the center of the line. When $\omega_{m2}$ is varied or swept by the frequency modulator 35, while $\omega_{m1}$ is held constant, then either field $H_0$ or frequency $\omega_1$ is varied or swept by the error signal from detector 36, and the spectrum is produced at the output from the detector 24. As an alternative, $\omega_{m1}$ may be varied or swept by coupling the modulator 35 to the generator 26 while $\omega_{m2}$ is held at constant frequency, in which case the field $H_0$ and frequency $\omega_1$ are held in constant ratio and $\omega_1 \pm \omega_{m1}$ scans the spectral resonances of the sample to be analyzed.

With the spectral line from detector 36 locked at the center of resonance, the automatic homogeneity control of this invention may be effectively employed. In accordance with this embodiment of the invention, the inhomogeneity or gradient components of the field $H_0$ are modulated a small amount at a low frequency, and the change in inhomogeneity produced by this modulation is detected so as to give an error signal which is used to automatically optimize the homogeneity. The phase of audio frequency $\omega_{m2}$ is controlled by a phase control 44 so that the output from a phase detector 42 is an absorption mode signal of the reference sample. Therefore, while the output from detector 36 holds itself to the center of the line as shown by the operating point in FIG. 2a, it also is holding the output from detector 42 to the operating point of the absorption mode of the same line, as shown in FIG. 2b.

The shim coils 40 associated with magnet members 12 are used to produce the modulation of the magnetic field inhomogeneity as well as to optimize the homogeneity. Separate coils can be used or the magnet shape can be changed to optimize the inhomogeneity. A low frequency generator 50 is coupled to modulator 54 which changes current through coils 40 and thereby produces a periodic change in field gradient at probe 10. This change of field gradient can periodically change the absorption lines from shape A to shape B of FIG. 3. When the output of detector 42 is held at the operating point of FIG. 2b, such a field gradient modulation will result in a periodic modulation of the output from detector 42. This output is connected to a low frequency phase detector 48 via the low frequency amplifier 46. The reference signal for the phase detector 48 is derived from the low frequency generator 50, and therefore, any signal from the low frequency amplifier 46 that is coherent with the generator 50 produces a DC output from detector 48. This DC output is amplified by amplifier 51 and is used by current control 52 to change the current in coils 40 so that the observed resonance line has the greatest amplitude.

Thus, it is seen that any variation in field homogeneity is manifested as a change in amplitude of the detected magnetic resonance signal, with a resultant shift or decrease in amplitude from maximum resonance. The changing amplitude of the absorption signal appears as an error signal at the phase detector 48, whose output is utilized to control the current to the shim coils 40.

If it were desired to provide a controlled field that is not homogeneous, but with constant gradients, then a compensating signal from generator 50 whose amplitude is controlled by a gradient control 53 is mixed with the output from the low frequency amplifier 46. In such case, the error signal output from the phase detector 48 will only be zero when the output from the amplifier 46 is equal and opposite to the compensating signal from the generator 50.

Figure 3:
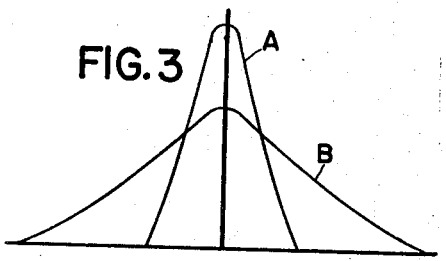
FIG. 3 is a pair of curves depicting spectral peaks that will aid in the explanation of the invention.

FIG. 3 illustrates a condition of maximum resonance, curve A, for an observed spectral line; and a broadened spectral line B which results when the gradient of the magnetic field $H_0$ is present and the magnetic field becomes nonhomogeneous. By means of the present invention, the gradient of the polarizing field $H_0$ is maintained at a minimum and substantially constant, and affords optimum resonance and sharp spectral lines with substantially maximum amplitude peaks.

Figure 4A:
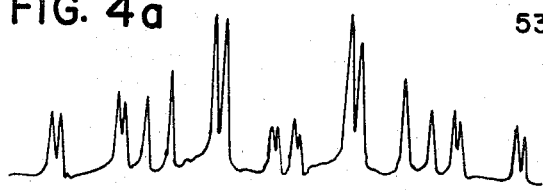
FIGS. 4a–c are a series of waveforms representing spectral traces that are observed with and without the automatic homogeneity control of this invention.
Figure 4B:
Figure 4C:
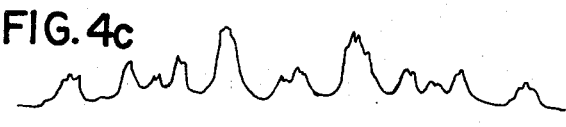

In FIG. 4, there is shown a series of spectral traces which were actually observed when utilizing the automatic homogeneity control of this invention. The sample used was ortho dichlorobenzene in a Varian Associates HR60 high resolution spectrometer. FIG. 4a depicts a trace at the beginning of operation of the apparatus; FIG. 4b represents a spectral trace for the same sample after a period of three hours when employing the automatic homogeneity control of this invention; and FIG. 4c represents a spectral trace for the same sample after a three hour period with the inventive homogeneity control not in use.

The inventive apparatus may incorporate more than one shim coil set and may utilize orthogonal coils for X, Y and Z linear gradient corrections, as well as for higher order gradient corrections. For example, separate current controls 52A, B and modulates 54A, B associated with separate shim coils 40A and 40B, such as depicted in FIG. 5, may be used for this purpose.

In operation, the signal from the low frequency phase detector 48 of FIG. 1 is fed through a DC amplifier 49 and a multipole switch $S_1$ alternately to the current control circuits, here illustrated as connected to circuit 52A in FIG. 5. When so positioned, the switch $S_1$ also connects the output of the low frequency generator 50 to the modulator 54A. A programmer 56 controls the action of the switch $S_1$, to energize selectively the control circuit 52A and modulator 54A or the current control 52B and modulator 54B cyclically.

Each of the current controls 52 comprises a DC motor 60 which controls a variable resistor or potentiometer 62. The potentiometer 62 is coupled to a battery 63, which has a center tap coupled to one end of the associated shim coil 40. Each of the modulators 54 comprises an amplifier 64 and a transformer 66, having its secondary winding coupled to the other end of the shim coil 40 than the battery tap.

In FIG. 6a, a series of resonance lines indicates the variations which occur as the shim current to the Y gradient coil is increased. FIG. 6b represents a plot of the resonance peak amplitudes, such plot being symmetrical about the maximum amplitude peak. If the shim current is such that one sweeps symmetrically from point 2 to 4, then the height of the observed signal will not change with the slow square wave sweep. However, if the shim current is not optimized, then an asymmetrical change in signal height as from point 1 to 2, or point 4 to 5 is experienced. With the use of low frequency phase detector 48, a plus or minus signal is obtained, depending on which side of the optimum shim coil current $I_s$ the system is operating. This signal, with correct polarity, is fed to the shim coils 40 to maintain a homogeneous polarizing field.

Another embodiment of the invention is depicted in FIG. 7, wherein a probe 10 is disposed between the poles of a magnet 12 that is coupled to a power supply 70 to provide a polarizing field $H_0$. An R.F. generator 72 generates an exciting signal that is applied to the sample probe 10, which may contain an unknown sample as well as two reference compounds such as TMS and a nickel compound that serve as references. Resonance of the TMS sample may be obtained at 2 kHz. signal at the output of the R.F. phase detector 84 which signal is supplied by a generator 74 coupled to the magnet coils 28; whereas resonance of the nickel compound may be obtained at 2.1 kHz. that is supplied by a generator 76 through a programmer comprising a sequencer 78, alternately to the gradient shim coils 40 and curvature coils 80. The sequencer 78 may have a switching period of one minute, by way of example. The 2 kHz. signal is used in a feedback loop or channel to lock the polarizing field or frequency of the R.F. field at the center of resonance; while the 2.1 kHz. signal is used in an automatic homogeneity control feedback loop or channel, as described hereinafter.

To derive the spectral trace of the unknown sample, an audio frequency oscillator 82 supplies a modulating signal which can be scanned between 1–2 kHz., for example, to the coils 28. In operation the sideband resonance signals from the sample to be analyzed in the probe 10 are detected by an R.F. receiver 83 and fed to an R.F. phase detector 84, which simultaneously receives the R.F. signal from the generator 72 and thereby produces a DC voltage with an AC component. This varying signal component is then compared in an audio frequency phase detector 86 with the signal generated by the audio generator 82, the generated signal being first passed through a phase control 88. A DC output signal is produced by the phase detector 86 and is utilized to form a display of a resonance spectrum or line on a recorder or scope, in a well known manner.

In the field-frequency lock channel, the 2 kHz. signal received from the sample is phase detected and compared to a reference signal in a phase detector 90, such reference signal being obtained from the generator 74 through a phase control 92 that sets the phase for dispersion mode detection. The phase detector 90 produces a DC error voltage that is applied to the magnet power supply 70 for adjusting the polarizing field $H_0$ to maintain the condition of resonance.

The automatic homogeneity control loop of this invention includes a phase detector 94 that is coupled to the output circuit of the R.F. phase detector 84, wherein the 2.1 kHz. component of the detected signal is compared to a reference signal derived from the generator 76. The error signal derived from the phase detector 94 is applied to a sequencer 96 that is mechanically ganged to the sequencer 78. The sequencers 78 and 96, which serve as a programmer, act concomitantly to active alternately an integrator 98 which is coupled to the shim coils 40, and an integrator 100 that is coupled to the coils 80. The integrators 98 and 100 may take the form of motor driven potentiometers, known in the art. Any error signal that is derived from the phase detector 94 is fed through the sequencer 96 and through the conducting integrator 98 or 100 to the associated coils 40 or 80 respectively. Thus, a change in field gradient or curvature results in a control current from the phase detector 94 which is applied to the particular coil set that is simultaneously receiving the modulating signal used as a reference from the generator 76. In this manner, automatic homogeneity control may be achieved together with field or frequency control while detecting the spectral lines of a sample.

Figure 8:
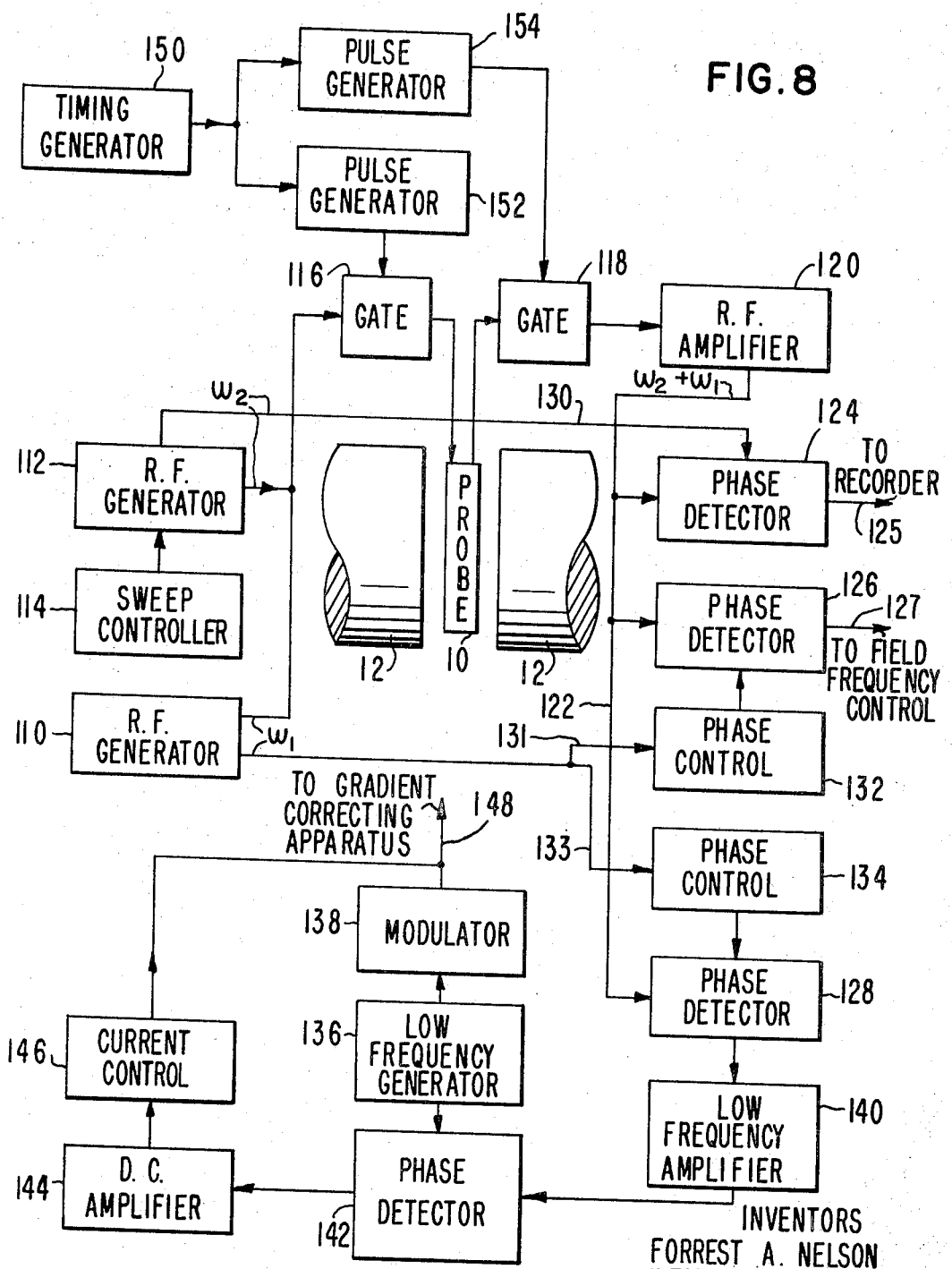
FIG. 8 is an alternate embodiment of the invention used in a multiple frequency source gyromagnetic apparatus which includes a pulsed input system.

In an alternate embodiment as shown in FIG. 8 the probe 10 is disposed between a pair of magnetic pole members 12 which provide the necessary polarizing field $H_0$. A first R.F. generator 110 is provided for generating a frequency $\omega_1$ for exciting to resonance a reference material such as TMS which may be mixed with the sample in probe 10. A second R.F. generator 112 is also provided for generating a frequency $\omega_2$ which is varied by a sweep controller 114. The R.F. signal $\omega_1$ and the variable radio frequency $\omega_2$ are then supplied to the probe 10 through a gate 116 for exciting to resonance certain nuclei of the analytical sample and reference material. From the probe 10 resonance signals are obtained in response to the excitation of the nuclei in field $H_0$ at frequencies $\omega_1$ and $\omega_2$. These signals are passed through a gate 118 and received by R.F. amplifier 120 which amplifies the relatively weak signals and applies them through line 122 to phase detectors 124, 126 and 128. The variable frequency $\omega_2$ is also fed from R.F. generator 112 through a lead 130 to phase detector 124 which produces an output signal representative of the resonance conditions of the nuclei being analyzed. This output signal is then supplied to an appropriate recording apparatus through output lead 125.

To provide field-frequency control, the frequency $\omega_1$ is conducted along line 131 through a suitable phase control means 132 to phase detector 126 which yields at output 127 a dispersion mode signal such as shown in FIG. 2a which is used to control either the field or the R.F. generators 110 and 112 for maintaining constant the ratio of magnetic field to applied R.F. field.

In order to provide magnetic field gradient and homogeneity control in accordance with the present invention, $\omega_1$ is supplied from R.F. generator 110 along the line 133 through phase control means 134 to phase detector 128 which produces an absorption curve such as shown in FIG. 2b. As explained hereinbefore, a change in field gradient at probe 10 will cause a corresponding change in the absorption line as shown in FIG. 3. Similarly, as explained earlier if means are provided such as low frequency generator 136 and modulator 138 for modulating the field gradient using shim coils or other field gradient altering means to produce a periodic change in the absorption line, as shown by curves A and B in FIG. 3, and if the output of detector 128 is held at the operating point as shown in FIG. 2, such modulation will result in a periodic modulation of the output of phase detector 128. This output is then connected to a low frequency phase detector 142 through amplifier 140.

The output of low frequency generator 136 is also fed into phase detector 142 for use as a reference signal such that any signal received from amplifier 140 which is coherent with that of generator 136 will product a DC output which is proportional to the peak amplitude change of the absorption line as the field gradient is periodically varied, or modulated, at the probe 10. This DC signal is amplified by amplifier 144 and is then used by a current control means 146 to supply control current to a suitable gradient correcting apparatus. The modulating and gradient correcting currents passed through lines 147 and 148 respectively may be applied to shim coils 40 such as described earlier in this specification or may be used to energize suitable mechanical control or servo apparatus for controlling magnetic field correction devices such as disclosed in the patents to Nelson 3,056,070 and Sullivan 3,223,897.

Figure 10:
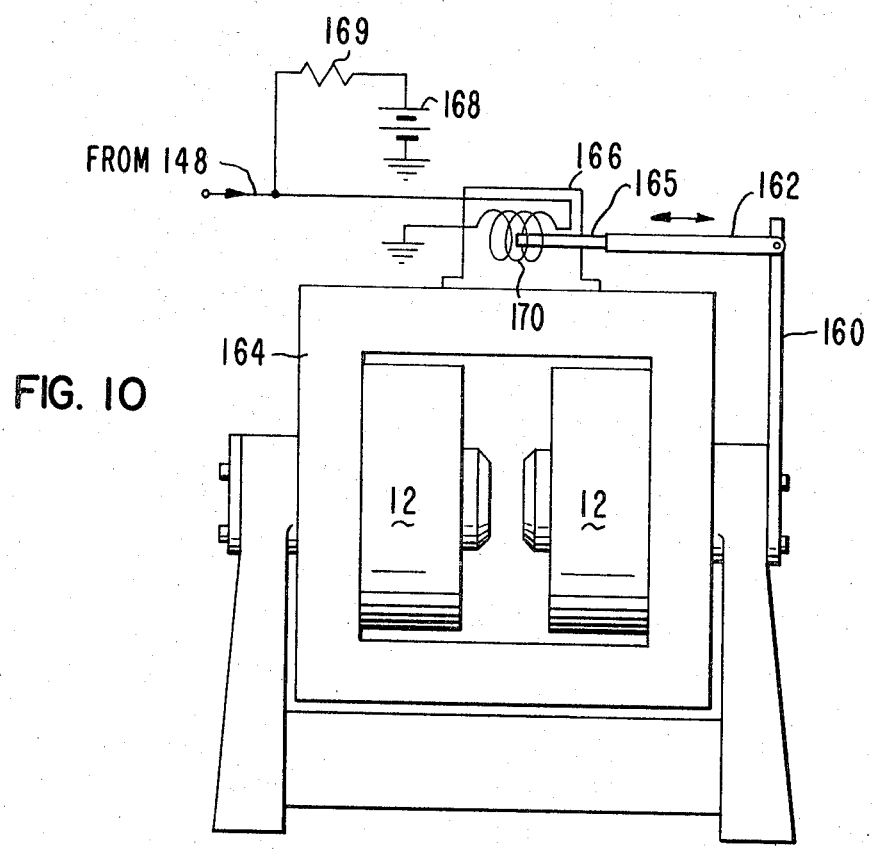
FIG. 10 illustrates an alternate control apparatus in accordance with the invention.

In FIG. 10, for example, there is shown an embodiment of a mechanical control apparatus for stressing the magnetic structure of the magnet 12 so as to alter the magnetic field between the pole faces. A moment lever arm 160 and shaft 162 provide torque applying means for stressing the yoke 162 supporting magnetic poles 12. Reciprocating forces are applied to shaft 162 by a force applying means 166 which is rigidly attached to yoke 164. The means 166 may be a solenoid or other force applying means of any suitable type which is capable of simultaneously applying rectilinear pulsating forces to the shaft 162 in response to the low frequency signals received from modulator 138 and a unidirectional force in response to the DC gradient control signal received from current control means 146. The pulsating forces transmitted from armature 165 through shaft 162, etc., cause modulation of the magnetic field gradient in a similar manner to that accomplished using coils 40 in the previously described embodiment and thus enables field gradient detection. The field gradient is corrected by applying a controlled force to the yoke 164 in the manner described and in response to a control signal received from the current control means 146. A DC source 168 is also shown for supplying a bias current through resistor 169 to the winding 170 so that even during conditions of optimum field homogeneity a small modulatable current is applied to winding 170.

Figure 9:
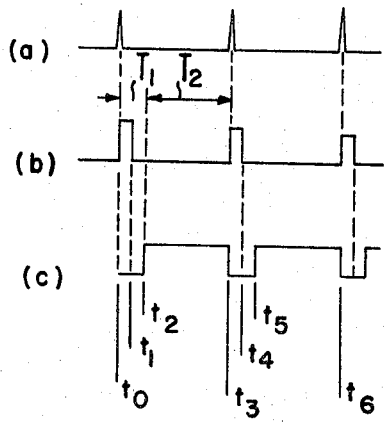
FIG. 9 illustrates the "on" times of certain gating means of the apparatus in accordance with the invention.

Although it is possible to operate the transmitter and receiver in a steady state condition, interaction between transmitted and received signals in the probe 10 and amplifier 120 tend to produce certain undesirable effects which can be eliminated by use of the pulsing apparatus shown in FIG. 8. A timing generator 150 provides an output for triggering "on" pulse generators 152 and 154 which respectively control gates 116 and 118. As illustrated in FIG. 9a a chain of pulses is generated by timing generator 150. These pulses may, for example, have a typical reoccurence period of 10 $\mu$sec. At the initiation of the first pulse at $t_1$, generator 152 is caused to turn ON for a period of approximately 1 $\mu$sec. as shown in FIG. 9b, thereby opening gate 116 so that the excitation signals from generator 110 and 112 are applied to probe 10 for approximately 1 $\mu$sec. This same first pulse causes generator 154 to be turned OFF for 2 $\mu$sec. (interval $T_1$—see FIG. 9) and then to be turned ON at $t_2$ and remain ON for the next 8 $\mu$sec. (interval $T_2$) until $t_3$. During this ON period gate 118 is "open" allowing R.F. amplifier 120 to receive resonance signals from probe 10. Since the decay period of the excited nuclei is considerably larger than the pulsing period of timing generator 150, once these nuclei are excited they continue to precess in the field $H_0$ until the next pulse causes them to again be energized at $t_3$, $t_6$, etc. Therefore, if gate 116 is "closed" at $t_1$ and gate 118 "opened" at $t_2$, allowing the applied field to die out during the interval between $t_1$ and $t_2$, any interaction between the transmitted and received pulses is effectively eliminated.

Although the invention as described in the several embodiments above has been illustrated using nuclear magnetic resonance signals as a means of detecting and controlling magnetic field gradients, it is to be understood that other atomic or molecular resonances which depend upon the magnetic field strength could also be used. For example, the sample matter could contain unpaired electron spins and an electron spin resonance signal could be used. Or it could contain ions in a vapor phase, perhaps generated in the probe itself, and an ion cyclotron resonance signal could be used.

Figure 11:
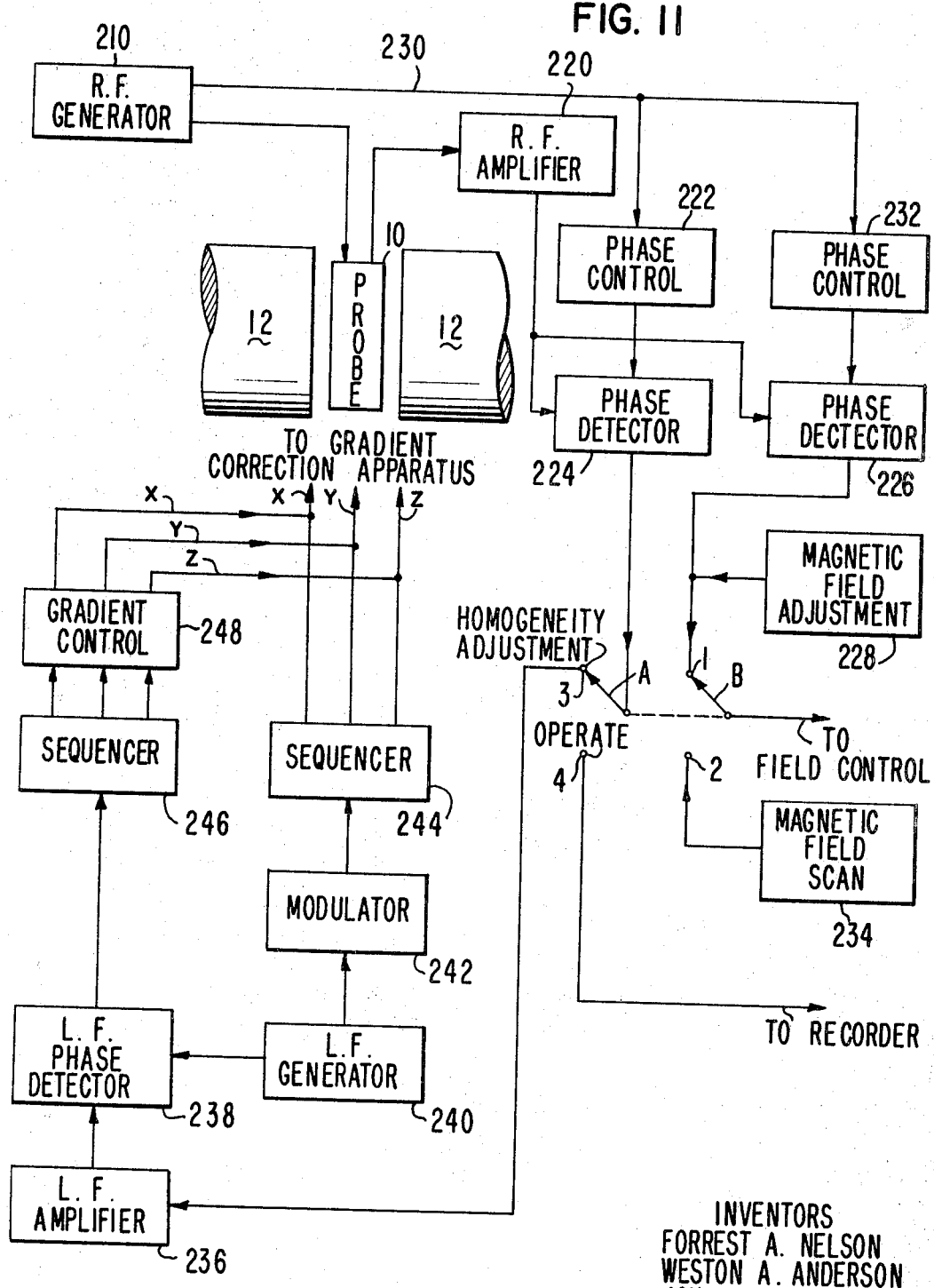
FIG. 11 shows another embodiment of the invention whereby homogeneity correction may be selectively applied.

In some such applications, it is not practical due to the nature of the test procedure and apparatus to provide continuing magnetic field homogeneity measurement and control. The following embodiment of the invention which is shown in FIG. 11 of the drawing is suitable for use in such application and a system is described wherein a homogeneous field condition may be preset before the analytical operation is begun or may be reset and/or later corrected at any desired time or test sequence.

The R.F. generator 210 supplies radio frequency energy to the probe 10 which is positioned between the poles of a magnet 12 which supplies the polarizing magnetic field. The R.F. amplifier 220 receives resonance signals from the probe 10, amplifies the signals and supplies them to phase detectors 224 and 226 respectively. The output of R.F. generator 210 is also supplied from a line 230 to phase control apparatus 222 and 232 which also are connected to phase detectors 224 and 226 respectively. The output of phase detector 226 is connected to contact 1 of a pair of contacts 1 and 2 which are contacted by a switch arm A which leads to suitable field control apparatus. Also connected to contact 1 is a magnetic field adjustment apparatus 228 for making initial adjustments to the magnetic field through the field control means. In its other position the switch arm A connects the magnetic field scan apparatus 234 through contact 2 to the field control means for providing a scan of the magnetic resonance spectrum. The output of phase detector 224 is connected to a switch arm B which energizes either of a set of contacts 3 and 4. When the arm B is connected to contact 3 the output of the phase detector is used to adjust the homogeneity of the field. When the arm B is switched to contact 4 the output of the phase detector 224 is fed to a recorder so as to record the magnetic resonance spectrum which is scanned by a magnetic field scanning apparatus 234. It will be noted that switch arms A and B are ganged together and may be manually activated.

When the output of phase detector 224 is connected to contact 3 for adjusting the homogeneity of the field, the output signal thereof is fed into a low frequency amplifier 236 and then to a low frequency phase detector 238. A low frequency generator 240 is provided for supplying to the gradient correction apparatus, through modulator 242 and sequencer 244, a low frequency signal for modulating the field and enabling the detection of the gradient condition. The output of the low frequency generator is also connected to the phase detector 238 which supplies, through a sequencer 246 and gradient control means 248, control signals X, Y and Z which are likewise conducted to the gradient correction apparatus. It should be noted that sequencers 244 and 246 are ganged together so that the modulation and control signals are simultaneously applied to sequentially energize the respective X, Y and Z correction apparatus.

It will be apparent that by placing the switches A and B in the 1-3 contact position the magnetic field adjusting apparatus 228 will cause the field control means to bring the field within operating range of the phase detecting means 226 which will then cause the field to be held at a given field strength. During this time the field homogeneity control apparatus sequentially energizes the respective X, Y and Z gradient correction devices so as to optimize the magnetic field in the vicinity of the probe 10. The switches A and B are then changed to the 2-4 position and the field is scanned by magnetic field scanning control means 234 and the resonance signal is recorded on a suitable recording apparatus. During the scanning and recording period the gradient control means 248 continues to energize the gradient correction apparatus to the degree that it was so controlling at the time the switches A and B were switched from the homogeneity adjustment position 1-3 to the operating position 2-4. The gradient control means can however, be reset at any subsequent time by merely changing the switches A-B back to the 1-3 position.

Referring now to FIG. 12 there is depicted a block diagram showing the functional interrelationship of the various components of an ion cyclotron resonance mass spectrometer apparatus in accordance with the present invention. It will be observed that the analyser 300 has an evacuable envelope 302 containing a suitable analyser structure in which ionization and subsequent analysis occur. One such structure is disclosed in U.S. Patent No. 3,390,265 assigned to the assignee of the present invention. Evacuation to a very low pressure, typically $10^{-8}$–$10^{-9}$ torr prior to sample introduction, is by means of a vacuum system 306 connected through a tube 308 to the envelope 302. A typical vacuum pump employed is a sputter-ion pump of the type disclosed in U.S. Patent No. 2,993,638 issued July 25, 1961 and assigned to the same assignee as the present invention. Once pumpdown to $10^{-8}$–$10^{-9}$ torr is obtained a gaseous sample to be analyzed may conveniently be introduced to the apparatus through an inlet 310 to the vacuum pump until a pressure in the $10^{-7}$ torr range is achieved.

Ions produced within the analyser 300 are subjected to an oscillating field which is produced across the electrodes of the analyser and in a direction at right angles to the magnetic field generated between the poles 12. The resonant ions, i.e., those ions whose mass-to-charge ratio generally satisfy the equation $$e/m = \omega/B$$

where:

$e$ = the charge of the ion,
$m$ = the mass of the ion,
$\omega$ = the frequency of the oscillating field, and
$B$ = the transverse magnetic field strength, will absorb energy from the oscillating field and are caused to pursue an expanding spiral path within the analyser. The net amount of energy absorbed by the ions can be then detected in a suitable circuit and without resonant ion collection.

Ions of differing mass-to-charge ratio may be brought into resonance with the oscillating field by varying the frequency of the oscillating field or the strength of the magnetic field, or both. As illustrated in the diagram, means 312 are provided for regulating the magnetic field intensity providing, for fixed frequency $\omega$, a linear readout of mass-to-charge versus field strength and when used with an x-y recorder 314, a linear mass-to-charge versus position readout. The magnetic field regulator 312, which can be used to reverse the direction of the field as well, may be of the type disclosed in U.S. Patent No. 3,267,368, assigned to the same assignee as the present invention.

The oscillating voltage required to produce the oscillating field is derived from the limited oscillator 316, and where resonant absorption takes place in the analyzing region, a change in the oscillating level occurs. In order to detect these small changes a modulation method is employed. Modulation of the magnetic field, the frequency, the electron current and the electron voltages have all been successfully used. As illustrated in the diagram, modulation of the analyser electrode voltages is accomplished by the provision of a square wave or other pulse type generator 318 the output of which is applied to the static voltage power supply 320, thence to the analyzing region. At resonance, the signal will be an amplitude modulated radio frequency from the limited oscillator 316. This signal is detected and amplified at 322 and can either be monitored on an oscilloscope 324 or fed to a phase sensitive detector 326. Phase detector 326 compares the signal against the square wave and gives an output which is proportional to the absorption in phase with the modulation originally fed to the static voltage power supply 320.

The output of phase detector 326 is connected to a switch arm 328 which is switchable between either of a set of contacts 1 and 2. When the arm 328 is connected to contact 1 the output of the phase detector is used to adjust the homogeneity of the field. When the arm 328 is switched to contact 2 the output of the phase detector 224 is fed to a recorder 314 so as to record the resonance spectrum.

When the output of phase detector 326 is connected to contact 1 for adjusting the homogeneity of the field, the output signal thereof is fed into a low frequency amplifier 336 and then to a low frequency phase detector 338. A low frequency generator 340 is provided for supplying to the gradient correction apparatus, through modulator 342 and sequencer 344, a low frequency signal for modulating the field and enabling the detection of the gradient condition. The output of the low frequency generator is also connected to the phase detector 338 which supplies, through a sequencer 346 and gradient control means 348, control signals X, Y and Z which are likewise conducted to the gradient correction apparatus. It should be noted that sequencers 344 and 346 are ganged together so that the modulation and control signals are simultaneously applied to sequentially energize the respective X, Y and Z correction apparatus.

It will be apparent that when the switch 328 is connected to contact 1 the field homogeneity control apparatus sequentially energizes the respective X, Y and Z gradient correction devices so as to optimize the magnetic field in the vicinity of the probe 10. The switch 328 is then changed to the 2 position, the field is scanned and the resonance signal is recorded on a suitable recording apparatus 314. During the scanning and recording period the gradient control means 348 continues to energize the gradient correction apparatus to the degree that it was so controlling at the time the switch 328 was switched from the homogeneity adjustment position 1 to the operating position 2. The gradient control means can however, be reset at any subsequent time by merely changing the switch 328 back to the 1 position.

It should be understood that the scope of this invention is not to be limited to the particular embodiments shown or to those values and parameters specified above. For example, two separate amplifiers may be used in lieu of the single audio frequency amplifier 22, with a tuned filter for the fixed frequency amplifier, which would appear in the recording channel in the above embodiment. In this respect, either the recording channel or the field frequency control channel may employ a fixed frequency modulating signal, while the other utilizes a variable frequency modulation signal. In such event, the frequency modulator 35 would be coupled to either generator 26 or generator 34 (as now shown) to vary the frequency of the modulating signal $\omega_m$. Also, the modulating signals $\omega_{m1}$ and $\omega_{m2}$ may be fed either to a common modulator coil or to separate coils. The low frequency modulator 54 may comprise a DC supply and a switch or relay; and the low frequency phase detector may also be a switch or relay; or a single relay with several contacts can be used for both the modulator and detector. The current control may be a DC supply and a variable resistor or an electronic integrator as in FIG. 7, or a DC amplifier plus a filter. Furthermore, the control current need not be directed to shim coils for changing the pattern of the polarizing field, but may be utilized for varying the geometry of the magnet so that homogeneity may be realized.

Many alterations and modifications will be apparent to those of skill in the art after having read the foregoing description and it is understood that this description is for purposes of illustration only and is in no manner intended to be limiting in any way and that we intend that the appended claims be interpreted as covering all modifications which fall within the true spirit and scope of our invention.

What is claimed is:

1. A gyromagnetic resonance apparatus comprising: means for applying a polarizing magnetic field to a sample located in said field; signal generator means for applying an exciting radio frequency magnetic field to said sample to obtain a magnetic resonance signal therefrom; means for detecting such resonance signal; means including shim coils positioned in said magnetic field for producing a change in said magnetic resonance signal dependent upon the gradient of said magnetic field in the vicinity of said shim coils, and means coupled to said magnetic resonance detection means for sensing said gradient dependent change to produce a control signal in response thereto and for controlling said magnetic field gradient in response to said control signal.

2. A gyromagnetic resonance apparatus as in claim 1 further including means for modulating the polarizing field; means for comparing the modulation components of the detected resonance signal with a reference signal from the modulating means, and means for controlling at least one of said polarizing or exciting radio frequency magnetic field applying means whereby the ratio of the polarizing field to the frequency of the radio frequency magnetic field is controlled.

3. Apparatus as claimed in claim 1 wherein said means for producing a change in said magnetic resonance signal includes an alternating frequency generator for supplying a modulation signal to the field gradient at the sample to produce a modulation of the resonance from the sample dependent on the gradient.

4. Apparatus as claimed in claim 3 wherein said modulation is a square wave modulation.

5. A gyromagnetic resonance apparatus comprising: magnet means for providing a polarizing magnetic field; means associated with said magnetic field for varying a gradient of said magnetic field; a probe containing a sample to be analyzed and a reference sample disposed in such polarizing magnetic field; means for exciting said samples with a radio frequency magnetic field to produce magnetic resonance therefrom; means for detecting the magnetic resonances of such samples; a first signal channel coupled to said detecting means for recording the detected resonances from one of said samples; a second signal channel coupled to said detecting means for controlling the radio between the polarizing magnetic field strength and the frequency of said radio frequency magnetic field in accordance with the resonances detected from one of said samples; and a third signal channel coupled to said detecting means and to said gradient varying means for detecting any change in the gradient in said polarizing magnetic field in accordance with the resonances detected from one of said samples and producing a control signal dependent on said gradient change, said third signal channel being coupled to said gradient varying means to change the gradient of said polarizing magnetic field in accordance with said control signal whereby a substantially homogeneous polarizing field is maintained.

6. A gyromagnetic resonance apparatus as in claim 5 wherein said field gradient varying means includes at least one set of shim coils positioned in said magnetic field.

7. A gyromagnetic resonance apparatus as in claim 5 wherein said first and third signal channels detect the absorption mode of the resonances, and said second channel detects the dispersion mode of such resonances.

8. Apparatus as claimed in claim 5 wherein said gradient varying means comprises means for modulating said gradient at an alternating frequency rate to produce a modulation of the resonance which is detected to produce said control signal.

9. Apparatus as claimed in claim 8 wherein said modulation is a square wave modulation.

10. A gyromagnetic resonance apparatus as in claim 6 wherein said third signal channel comprises: an alternating frequency generator for providing an alternating waveform of a frequency low relative to said radio frequency to modulate said magnetic field gradient and thereby modulate the magnetic resonance signal from said sample at said low frequency; a phase detector coupled to said low frequency generator and to said detecting means for producing said control signal from said detected resonance signal and; a current control means coupled to said phase detector and to said shim coils to change the current in said shim coils to correct for variations in the magnetic field gradient.

11. A gyromagnetic resonance apparatus as in claim 10 wherein said field gradient varying means comprises: a second set of shim coils; and means for switching said third signal channel alternately from one to the other of said shim coil sets.

12. A gyromagnetic resonance apparatus comprising: magnet means for providing a polarizing magnetic field; a set of shim coils disposed in said magnetic field for varying a gradient of said magnetic field; a probe containing an unknown sample to be analyzed and a reference sample disposed in said polarizing magnetic field; a radio frequency generator for providing an alternating magnetic field to said probe so that said reference and unknown samples may be excited to resonance; means for modulating one of said magnetic fields to produce a sideband resonance in the two samples; a receiver means for detecting the magnetic resonance signals of such unknown and reference samples; a first signal channel means coupled to said receiver means for recording the detected resonance signal from said unknown sample; a second signal channel means coupled to said receiver means for controlling the ratio of the polarizing field strength and the frequency of the alternating magnetic field in dependence upon the resonance signals from said reference sample; means including said shim coils for producing a change in at least one of the detected magnetic resonance signals dependent upon the gradient of said magnetic field in the vicinity of said shim coils, and means coupled to said magnetic resonance detection means for sensing said gradient dependent change in said one resonance signal to produce a control signal in response thereto and for providing a control current to said shim coils to control said magnetic field gradient in response to said control signal whereby a substantially homogeneous polarizing field is maintained.

13. A gyromagnetic resonance apparatus comprising means for applying a polarizing magnetic field to a sample located in said field, signal generator means for applying an exciting radio frequency magnetic field to said sample to obtain a magnetic resonance signal therefrom, means for detecting such resonance signal, means modulating a gradient of said polarizing magnetic field for producing a variation in said magnetic resonance signal dependent upon the gradient of said magnetic field in the vicinity of said sample, and means coupled to said magnetic resonance detection means for sensing said gradient dependent variation to produce a control signal in response thereto and for controlling said magnetic field gradient in response to said control signal.

14. A gyromagnetic resonance apparatus as described in claim 13 wherein means are provided for applying said R.F. field to said sample only during a portion of a periodically reoccuring time interval $T_1$ and means are provided for operatively connecting said detection means only during a periodically reoccuring second time interval $T_2$ wherein $T_2$ is greater than $T_1$.

15. A gyromagnetic resonance apparatus as recited in claim 14 wherein said means modulating a gradient of said polarizing magnetic field includes shim coils placed in said magnetic field for receiving said control signal.

16. A gyromagnetic resonance apparatus as recited in claim 14 wherein said means modulating a gradient of said polarizing magnetic field includes a means for causing deformation of the magnetic circuit of said means for applying a polarizing magnetic field.

17. In a gyromagnetic resonance apparatus including means for applying a polarizing magnetic field to a sample disposed in said magnetic field, signal generator means for applying an alternating magnetic field to said sample at an angle to said polarizing field for exciting said sample to resonance, means for detecting the magnetic resonance conditions of said sample and means for controlling the homogeneity of said polarizing magnetic field; said last named means comprising means modulating a gradient of said polarizing magnetic field for producing a change in said magnetic resonance conditions dependent upon the gradient of said polarizing field, means responsive to said resonance conditions for sensing said gradient dependent change and producing a control signal and a field gradient correction apparatus responsive to said control signal.

18. In the gyromagnetic resonance apparatus as described in claim 17 wherein means are provided for enabling the selective activation and deactivation of said homogeneity control means.

19. In a gyromagnetic apparatus as recited in claim 18 wherein said field gradient control apparatus includes shim coil means disposed in said polarizing magnetic field proximate to said sample.

20. In a gyromagnetic resonance apparatus as recited in claim 18 wherein said field gradient correction apparatus includes a mechanical control means for deforming the magnetic circuit of said means for applying a polarizing magnetic field to thereby alter the gradient condition of the polarizing magnetic field produced thereby.

21. A gyromagnetic resonance apparatus comprising means for applying a polarizing magnetic field to a sample located in said field, signal generator means for applying an exciting radio frequency magnetic field to said sample to obtain a resonance signal therefrom, means for detecting such resonance signal, modulating means for inducing a periodic modulation of the gradient of said polarizing field, other detection means coupled to said modulating means and to said resonance detection means for producing an output signal responsive to a change in the gradient of said magnetic field and control means coupled to the output of said other detection means for controlling the gradient pattern of said magnetic field.

22. Magnetic field homogeneity control apparatus for use in magnetic resonance detection apparatus comprising means for applying a magnetic field to a sample material, signal generator means for applying an alternating electric field to said sample for exciting an ion cyclotron resonance signal therefrom, means for detecting said resonance signal, means modulating a gradient of said magnetic field for producing a variation in said resonance signal dependent upon the gradient of said magnetic field in the vicinity of said sample material, and means coupled to said detection means for sensing said gradient dependent variation to produce a control signal in response thereto and for controlling said magnetic field gradient responsive to said control signal.

23. A method for maintaining magnetic field homogeneity comprising the steps of:
   (1) disposing a sample of material in said magnetic field,
   (2) exciting said sample to a resonance condition,
   (3) detecting said resonance condition,
   (4) modulating a gradient of said magnetic field so as to produce a variation in said detected resonance condition,
   (5) detecting said variation in said resonance condition to provide a gradient control signal, and (6) applying said signal to a means for controlling said magnetic field gradient.

References Cited
UNITED STATES PATENTS
2,859,403  11/1958  Kerchner.
2,922,947  1/1960  Bloom.
3,034,040  5/1962  Williams.
3,045,175  7/1962  Rollwitz.
3,147,428  9/1964  Anderson.

RUDOLPH V. ROLINEC, Primary Examiner.

MICHAEL J. LYNCH, Assistant Examiner.

U.S. Cl. X.R.

250—41.9